US007348536B2

(12) United States Patent
Bockel et al.

(10) Patent No.: US 7,348,536 B2
(45) Date of Patent: Mar. 25, 2008

(54) LIGHT GRID WITH HOUSING

(75) Inventors: Guenter Bockel, Waldkirch (DE); Ralf Friedrich, Buggingen (DE); Christof Meyer, Gutach (DE); Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 151 days.

(21) Appl. No.: 11/233,667

(22) Filed: Sep. 22, 2005

(65) Prior Publication Data

US 2006/0068624 A1     Mar. 30, 2006

(30) Foreign Application Priority Data

Sep. 25, 2004   (DE)   ............... 10 2004 046 725

(51) Int. Cl.
*H01J 40/14*   (2006.01)
(52) U.S. Cl. .................................... 250/221; 250/222.1
(58) Field of Classification Search ................ 250/221, 250/222.1
See application file for complete search history.

(56) References Cited

U.S. PATENT DOCUMENTS

| | | | |
|---|---|---|---|
| 5,149,921 A | | 9/1992 | Picado |
| 6,175,106 B1 * | | 1/2001 | Buitkamp et al. .......... 250/221 |
| 6,750,439 B2 * | | 6/2004 | Nakazaki et al. .......... 250/221 |
| 6,982,839 B2 * | | 1/2006 | Schuler ....................... 359/738 |
| 7,085,471 B2 * | | 8/2006 | Boeckel et al. ............. 385/147 |
| 2004/0124341 A1 * | | 7/2004 | Parstorfer et al. .......... 250/221 |
| 2005/0201086 A1 * | | 9/2005 | Friedrich ..................... 362/217 |

FOREIGN PATENT DOCUMENTS

| | | |
|---|---|---|
| DE | 19712828 A1 | 10/1998 |
| DE | 19934870 C1 | 1/2001 |
| DE | 003810 U1 | 6/2004 |
| DE | 10308285 A1 | 9/2004 |
| DE | 012794 A1 | 11/2005 |
| EP | 1439404 A2 | 7/2004 |

* cited by examiner

*Primary Examiner*—John R. Lee
(74) *Attorney, Agent, or Firm*—Townsend and Townsend and Crew LLP

(57) ABSTRACT

A light grid which has a housing made from an extruded profile. An electronic component plate is movably insertable into the interior of the housing and carries the optical components of an emitter unit or a receiver unit, respectively. The housing has a support plate and an intermediate web which connect spaced-apart side walls of the profile and include openings. The support plate also has openings into which corresponding optical function elements are inserted. The openings in the intermediate webs serve as apertures. To precisely align the component plate with the optoelectronic components thereon relative to the housing, positioning pins are inserted through openings in the support plate and the intermediate web and which further engage locating holes in the component plate.

7 Claims, 7 Drawing Sheets

LIGHT GRID WITH HOUSING

BACKGROUND OF THE INVENTION

This invention concerns light grids of the type which have a housing in which radiation emitters and transducers are arranged spaced apart from each other in an extruded profile adapted to receive and hold a longitudinally movable electronic component board.

Light grids are in wide use for recognizing and measuring objects on conveyors, for baggage control on baggage conveyors, for controlling the doors of elevators, for protecting hands and bodies in the vicinity of machinery, to control access for persons and vehicles, and so forth. Such light grids have frames on which associated emitting units and receiving units are mounted. The emitting units send light rays, typically infrared light, which strike the associated receiver units. Interruptions in the radiation are detected and used.

Each emitting unit has an optoelectronic element which is spaced apart in the direction of the light from an optical functional element. At the emitting unit, an optoelectronic transducer emits light which is focused on a corresponding receiver unit by the optical function element, such as a lens and/or an adjustable aperture. The receiver unit also has an optical function element which concentrates the light on an optoelectronic transducer.

The optoelectronic elements and the associated optical function elements of the individual emitter and receiver units must be mounted in a housing. They must be adjustable and be highly accurately positioned relative to each other. In this regard, it is known to mount the required optoelectronic elements and the associated optical function elements with, for example, a modular tubular structure in which the optoelectronic elements and the associated optical function elements are adjustably positioned. These modules are then installed in a housing, where they must be accurately positioned relative to each other and relative to the housing. The necessary adjustments of the optoelectronic elements and the optical function elements that must be made in such a module and on the housing are time-consuming and costly.

It is also known to form the housing as a U-shaped profile where the modules can be inserted through the open front end and then fastened, for example with a snap connection. Such U-shaped housings, however, have low torsional stiffness. Increasing the torsional rigidity of such an extruded profile requires heavier material cross-sections.

It is also known to employ a closed profile as the housing for a light grid. In such a case, the modules must be inserted in the longitudinal direction of the profile. Especially for great length, this is time-consuming and makes an accurate positioning of the modules in the housing difficult. In addition, this requires the machining of the extruded profile, which increases manufacturing costs.

It is also known to use tub-shaped plastic housings where modules can be readily installed. However, such housings require additional metal strengthening and rigidifying to attain the required stability and positional accuracy.

SUMMARY OF THE INVENTION

It is an object of the present invention to provide a light grid that has a positionally stable and strong but relatively reasonably priced housing which simplifies the installation process while assuring the highest degree of accuracy.

This is attained by constructing the housing as a longitudinal extruded profile which has a support plate and, spaced apart therefrom, an intermediate web. The two are plane-parallel and connect side walls of the housing to each other.

The intermediate web is located between the support plate and the earlier mentioned component plate. Axially aligned openings are arranged in the intermediate web and in the support plate, respectively, and optical function elements are mounted in the openings of the support plate. Positioning pins extend through the openings in the support plate, fittingly engage corresponding openings in the intermediate web, and also fix the position of a component plate in the housing.

According to the present invention, the housing is defined by a profile, preferably an extruded profile made from aluminum. The housing has two side walls which extend over the entire length of the housing. The side walls are connected by the spaced-apart support base and an intermediate web, all of which are of an integral construction. The support plate and the intermediate web are plane-parallel and spaced apart, and they form a rectilinear profile chamber that gives the housing a high degree of bending and torsional stiffness with a minimum amount of material. The support plate and the intermediate web have openings which are longitudinally spaced apart, and openings in the support plate are axially aligned with the corresponding openings in the intermediate web. At the aft side of the housing and behind the intermediate web is an electronic component board that carries the emitting and receiving elements, respectively, and the electrical circuitry required by them. The rear of the profile can be closed with a cover. Preferably, the profile has the housing base, which is integrally constructed with the side walls so that the side walls, the intermediate web and the base define a second chamber, thereby providing the rectilinear profile with two chambers, which further enhances the bending and torsional stiffness of the profile.

The openings in the support plate receive optical function elements such as lenses. In addition, positioning pins are inserted from the front of the light grid through openings in the support plate. The positioning pins traverse aligned openings in the intermediate web and engage locating holes in the component plate. Since the positioning pins fittingly engage the openings in the support plate and the openings in the intermediate web, the pins highly accurately position the component plate relative to the openings in the support plate and the intermediate web. As a result, the component plate, and the emitting and receiving elements carried by it, are highly accurately positioned relative to the optical functional elements in the support plate. In one embodiment, the openings in the intermediate web function as adjustable apertures for the emitting and receiving units. The aperture prevents light from radiating from the emitter in a lateral or side direction and, at the light receiver, prevents interfering random light from reaching the receiving elements.

The assembly of the light grid is very simple. Only the component plate needs to be inserted into the housing, preferably by sliding it in an axial direction from an open end of the profile. The optical function elements are then mounted in the openings of the support plate from the front of the light grid. The component plate with the emitters and receivers, respectively, attached thereto is then highly accurately positioned in the housing and fixed in place by inserting positioning pins from the front of the housing through associated openings in the support plate and the intermediate web. Without more, this highly accurately positions the respective optical emitting and receiving units each comprising an optoelectronic element (light source or receiver), the aperture of the intermediate web, and the optical function element. This results in a highly accurate positioning of the optical elements relative to the housing. The direct fixing and positioning of the optical elements in the housing prevents thermal factors from affecting the position and alignment of the light grid. Thermally induced changes in the length of the profile of the housing do not affect the position of the respective units because they are fixed in position by respective positioning pins at every longitudinal section of, or at regular intervals along, the profile. A particularly simple assembly of the light grid is possible by using a front pane to cover the front of the housing, and when the optical function elements are placed into the opening of the support plates from the front of the grid. It is particularly advantageous to place a gasket between the front pane and the housing which is resilient and arranged so that it presses against the functional elements, thereby fixing the elements in the openings of the support plate with a resilient pretensioning.

In another advantageous embodiment, the ends of the profile of the housing are closed with end caps, which can hold the connecting cable and plug for furnishing the electronic component plate with power. The end caps can also be fixed in position and secured to the housing with the positioning pins. This further simplifies the assembly of the light grid because the end caps do not require the otherwise necessary screw connection to the housing.

DESCRIPTION OF THE PREFERRED EMBODIMENTS

Figure 1:
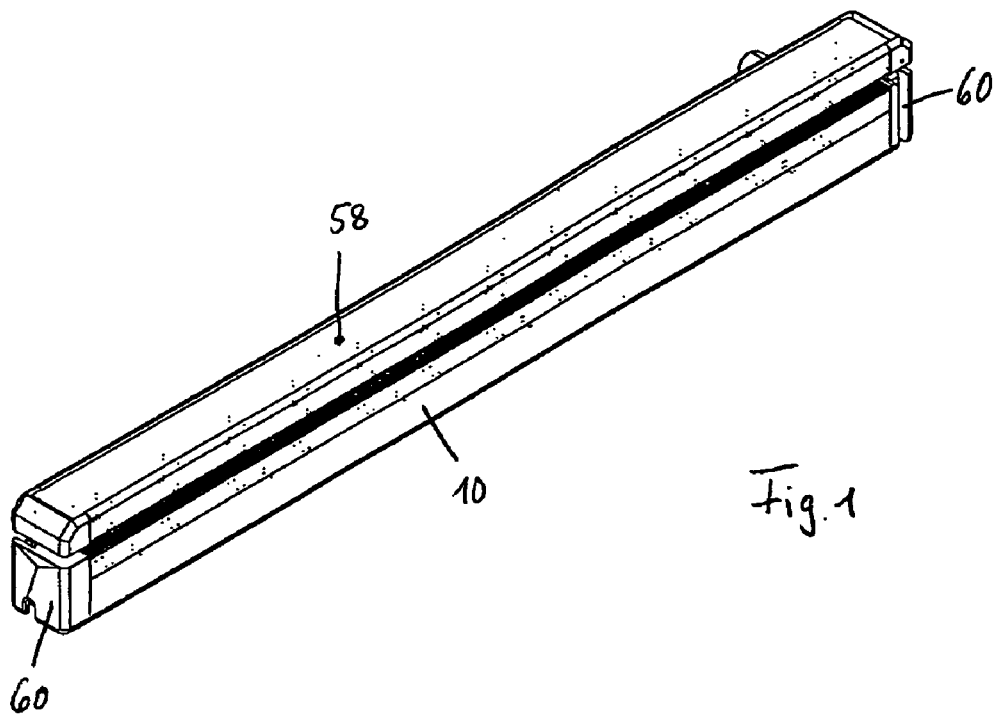
FIG. 1 is a perspective view of a light grid constructed in accordance with the invention.

The light grid of the present invention has an emitter part and a receiver part arranged opposite each other for monitoring a space between them. The two parts are principally identically constructed so that in the following only the emitter part is described. The receiver part is identical thereto except for the differences discussed below.

The emitter part and the receiver part each have a housing 10 in the form of an extruded profile that is preferably made of aluminum. The profile of the housing has a generally rectilinear shape with two parallel side walls 12. On their back sides, the side walls 12 are integrally constructed with and connected to a housing base 14, thereby closing the back side of housing 10. At a distance of about two-thirds the height of housing 10, as measured from housing base 14, are an intermediate web 16 and a support plate 18 which are integrally constructed and therefore connected to each other. The intermediate web 16 and the support plate 18 extend plane-parallel to housing base 14 and to each other, and the intermediate web 16 and support plate 18 are spaced apart. The side walls 12, housing base 14 and intermediate web 16 therefore define a first closed chamber. Likewise, the housing walls 12, intermediate web 16 and support plate 18 define a second closed chamber. The two chambers give housing 10 a high degree of bending and torsional rigidity with relatively thin cross-sections.

The side walls 12 define free-ended arms 20 which extend from the front side of support plate 18 that faces away from intermediate web 16. In the area between intermediate web 16 and support plate 18, the side walls 12 are moved inwardly to define external, longitudinally extending housing grooves 22 that are used for mounting the housing.

Figure 4:
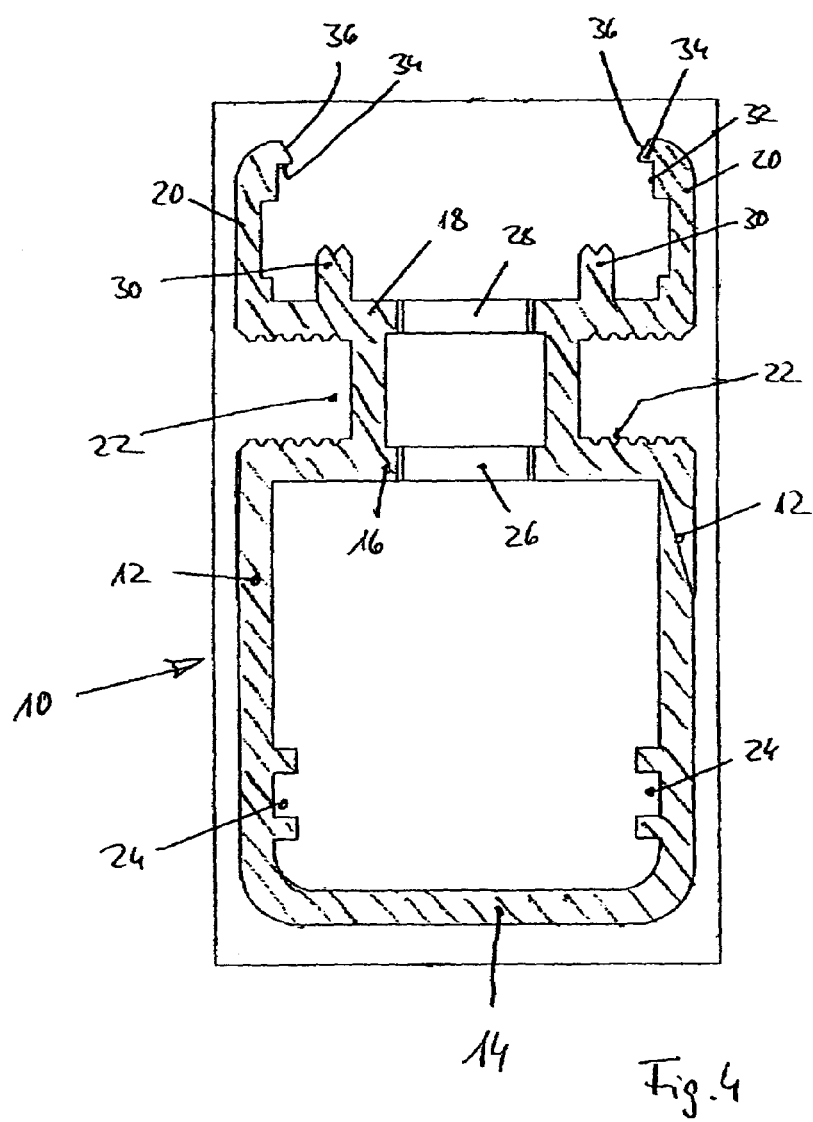
FIG. 4 is a cross-sectional view of the housing.

A relatively short distance above (as seen in FIG. 4) the housing base 14, each of side walls 12 define two spaced-apart, inwardly projecting ledges. The ledges form between each other opposite guides 24 which extend longitudinally along the side walls.

Intermediate web 16 has longitudinally spaced-apart openings 26 and 27. The support plate 18 has equally spaced openings 28 and 29 which are axially aligned with openings 26 and 27 in the intermediate web. As a result, openings 26 and 28 as well as openings 27 and 29 are axially aligned. Openings 26, 28 and openings 27, 29 have the same diameter.

A support bar 30 projects upwardly (as seen in FIG. 4) from support plate 18 on each side of openings 28 and extends in the longitudinal direction of the profile. The two free-ended outer arms 20 forming part of side walls 12 on the front side of the profile define between them a receiving space 32. Along the front side, a catch 34 extends inwardly relative to the receiving space from the free end of each arm 20. The front sides of catches 34 form inclined insertion guide surfaces 36.

An electronic component board 38 is slidably inserted into the housing 10 from one of the open longitudinal ends of the profile. The component board carries emitters 40, which are light-emitting elements, preferably infrared light-emitting diodes. The component board 38 further carries the necessary circuitry and electronic components for energizing emitters 40. The front end of component plate 38 carries a pinch connector 42 for establishing an electrical connection to the plate.

The receiving part of the light grid has receiving elements instead of light-emitting elements 40 on a correspondingly constructed electronic plate. The receiving elements can be transistors, for example photo diodes.

Emitters 40 arranged on the frontal surface of electronic component plate 38 are spaced apart and positioned so that when the plate is installed, the emitters are axially aligned with openings 26 and 28. Optical function elements associated with emitters 40 are arranged in associated openings 28 in support plate 18. The optical function elements are preferably lenses 44 which focus the light radiating from emitters 40. Openings 26 in intermediate web 16 function as apertures for the light directed by emitters towards lenses 40, and they further substantially prevent light from straying in lateral directions.

Positioning pins 46 precisely axially align emitters 40 with openings 26 and 28. Positioning pins 46 have a head 48 from which a cylindrical section 50 and a connection section 52 extend in an axial direction. Positioning pins 46 are inserted into openings 29 and 27 from the front side until their heads 48 are supported on the front side of support plate 18. The cylindrical section 50 following head 48 has an outer diameter which corresponds to the diameter of openings 26 and 29 that the pin can be slidably inserted while providing a snug fit. Cylindrical section 50 has an axial length that is selected so that the section extends through openings 29 and 27 when the positioning pin is fully inserted. In this manner, the positioning pin is positioned in housing 10 with a very high degree of accuracy. Connecting section 52, which axially extends from cylindrical section 50, has a pointed end that extends into locating holes 54 in electronic component plate 38 without play, thereby also accurately positioning the component plate in relation to housing 10. The precise positioning of component plate 38 results in a correspondingly precise positioning of emitters 40 arranged on the component plate relative to housing 10. This further results in a correspondingly accurate positioning of the emitters relative to openings 26 and 28 as well as lens 44.

Figure 2:
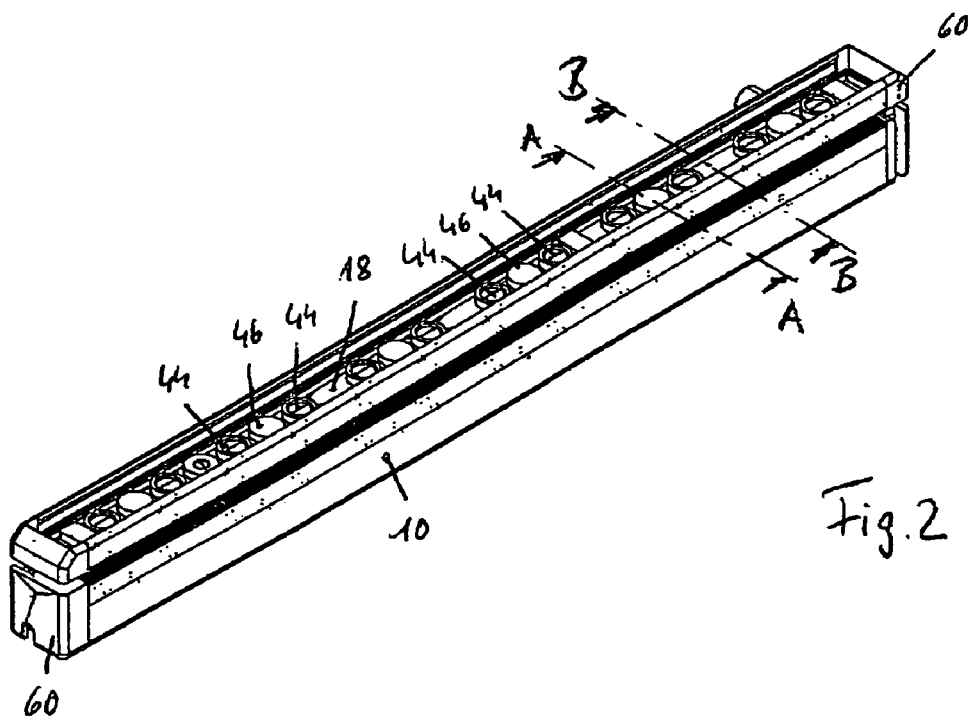
FIG. 2 is a similar perspective view of the light grid but with its front cover removed.
Figure 3:
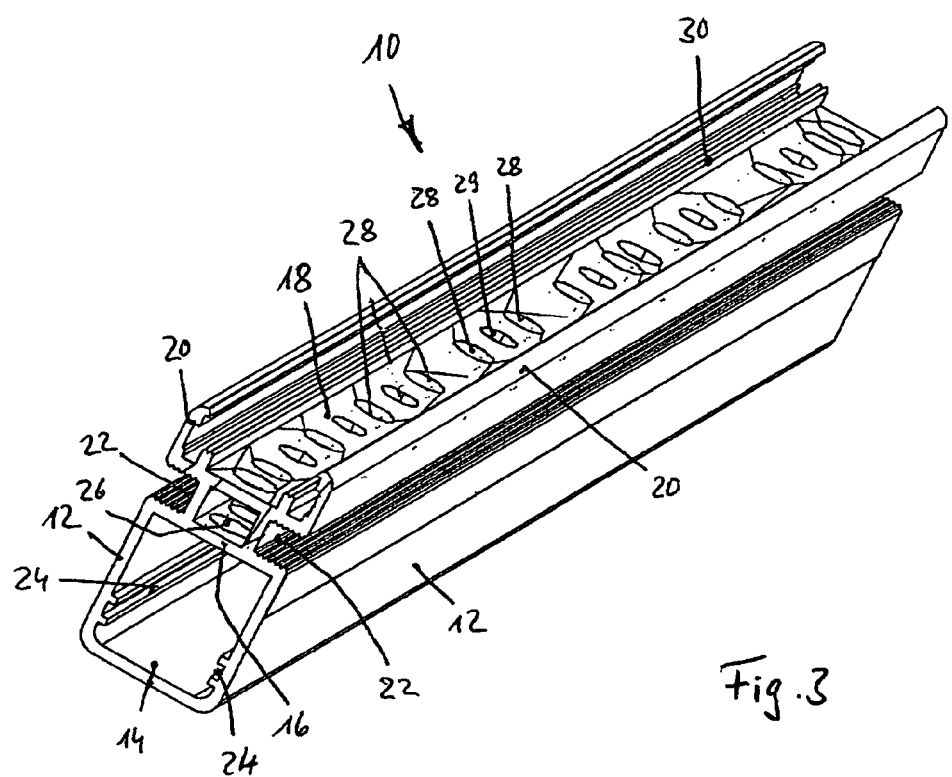
FIG. 3 is a perspective view of the housing for the light grid.
Figure 5:
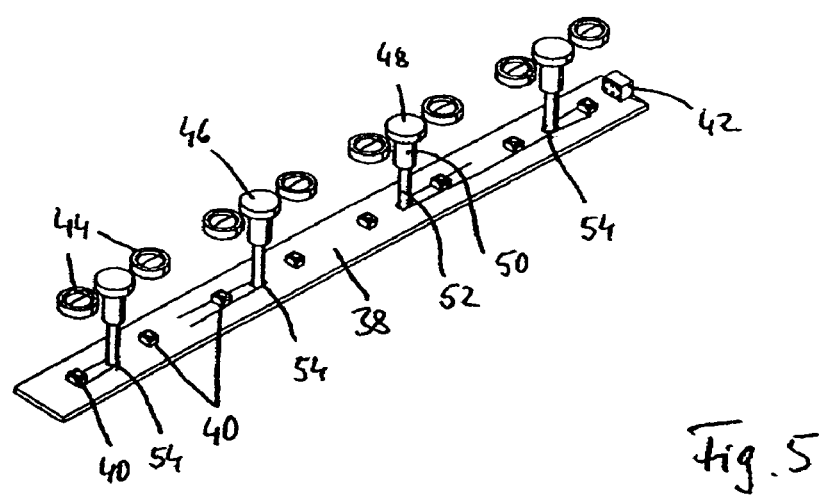
FIG. 5 shows the components mounted in the housing.
Figure 6:
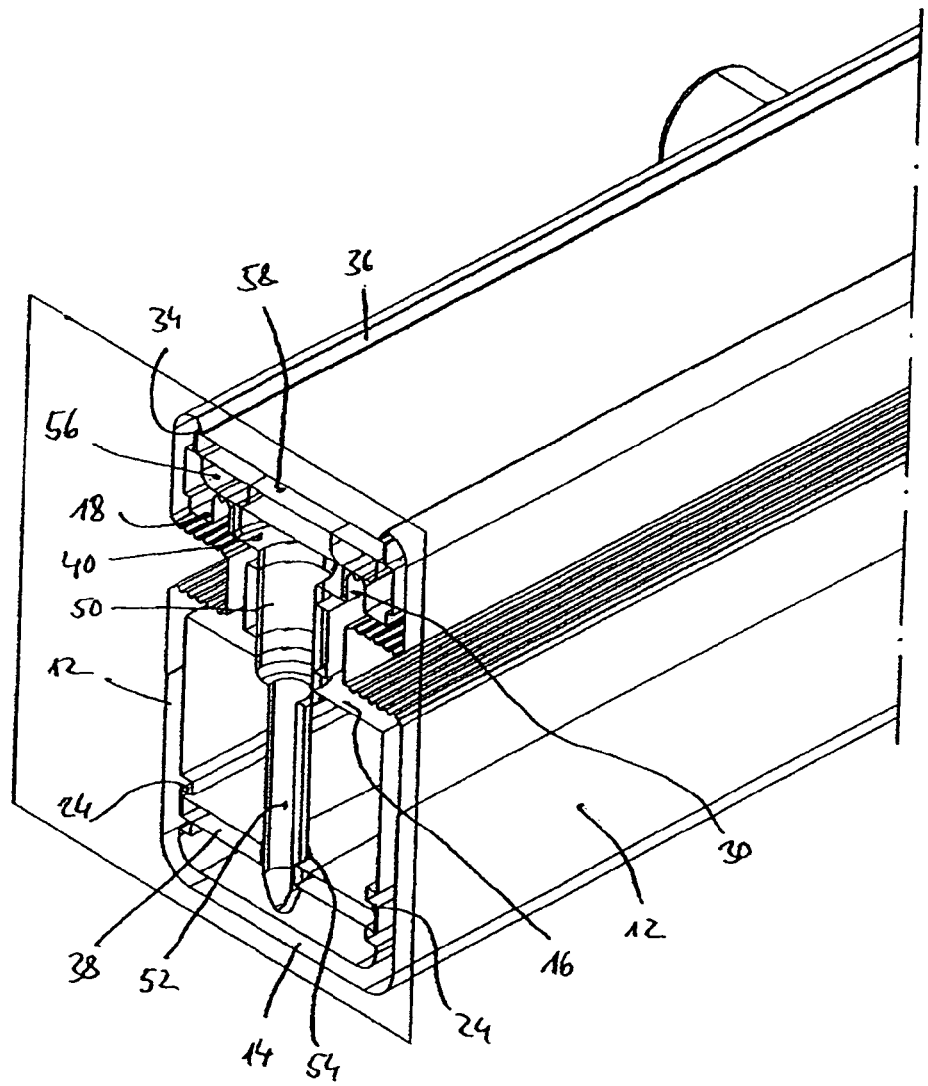
FIG. 6 is a cross-sectional view through the light grid along line A-A in FIG. 2.
Figure 7:
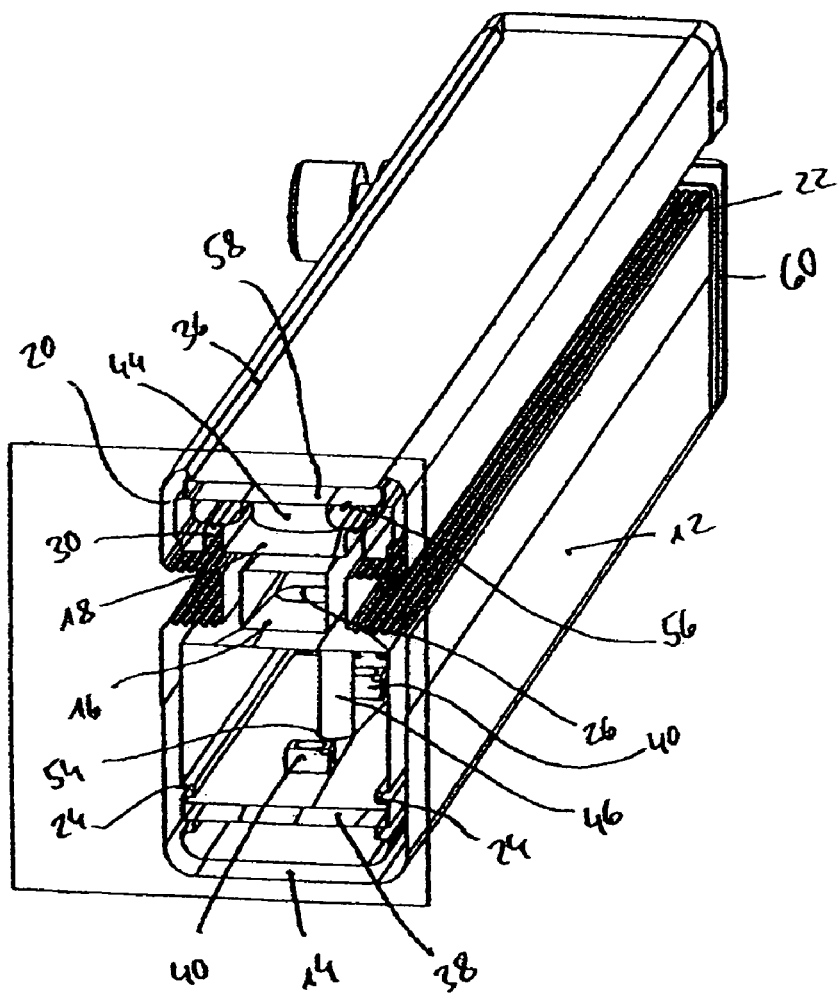
FIG. 7 is a cross-sectional view of the light grid along line B-B in FIG. 2.

The drawings illustrate an embodiment of the invention in which the openings 26 and 28 for the optical elements are arranged at equal spacings over the lengths of housing 10. In other words, lenses 44 are mounted in openings 28 and emitters 40 are arranged on component plate 38 so that their locations correspond to the locations of the openings. Between each pair of openings 26 and 27 provided with optical systems are openings 27 and 29 for engaging positioning pins 46, as is illustrated in FIGS. 2 and 5. Component plate 38 has locating holes 54 which correspond to the positions of openings 27 and 29 through which the positioning pins extend.

The light grid of the present invention is assembled by sliding component plate 38 from an end of the profile of housing 10 in a longitudinal direction to the approximately desired position. Positioning pins are inserted in openings 29 and 27 from the front side of the profile so that each connecting section 52 engages a corresponding positioning hole 54 in the component plate. This results in a highly accurate positioning of component plate 38 in housing 10. Lenses 44 are then installed by mounting them in openings 28 from the front side of support plate 18. Thereafter an elastic seal or gasket 56 is placed on top of support bars 30 from the front side of the light grid. Gasket 56 is a raised seal ring which rests on the support bars, extends in the longitudinal direction of the profile, and is closed at the ends of housing 10. Gasket 56 is wider than support bars 30 so that it extends inwardly past the support bars. Thereafter a frontal pane 58 made from a material which permits passage of the light emitted by emitters 30 is attached to the profile. The frontal pane 58 covers the entire frontal surface of housing 10 and is pressed from the front of the housing towards its back. The inclined insertion guide surfaces 36 urge arms 20 of side walls 12 resiliently outwardly as the pane is pressed against them until the frontal pane 58 is in receiving space 32 and catches 34 snap over the front side of the pane. The frontal pane engages the front side of gasket 56 and elastically compresses the gasket. In this manner, the portion of gasket 56 projecting inwardly past support bar 30 presses from the front against the peripheral portion of lenses 44 and heads 48 of positioning pins 46. This results in a fixation of the lenses and the positioning pins in the respective openings 28 and 29 of support plate 18 without the need for any additional securing devices. Each two emitters 40 and their associated openings 26 and 28 with lenses 44 therein are located in housing 10 with very high precision by positioning pins 46 located between them. As a result, thermal longitudinal changes of the entire housing 10 do not affect the highly accurate positioning of the optical elements.

Figure 8:
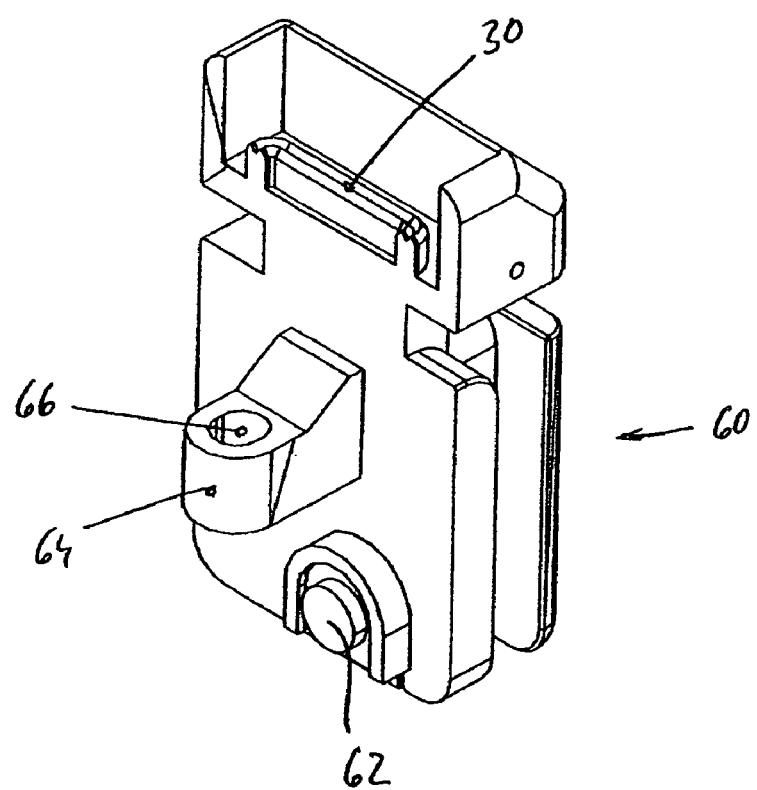
FIG. 8 shows an end cap of the light grid.

The respective ends of the profile of housing 10 are closed with end caps 60. As can be seen in FIG. 8, the end caps 60 have an outer periphery that corresponds to that of the profile. In the area of support plate 18, the support bar 30 is continued to support the closed ends of gasket 56. End cap 60 further has a cable access 62 for an electrical connection to the component plate 38. The end caps can be applied to the ends of housing 10 without tools. For that, the end caps include a projection 64 on the side facing the interior of the profile of housing 10 and a bore 66 that extends through the projection. When end cap 60 is placed against the end of the profile of housing 10, projection 64 extends underneath intermediate web 16 into the profile of housing 10. Bore 66 is located so that it is axially aligned with openings 27 and 29 in the profile. A positioning pin inserted in these aligned openings 27 and 28 therefore also extends with its connecting section 52 into bore 66 of end cap projection 64, which accurately positions the end cap in the profile of the housing and securely attaches it thereto.

What is claimed is:

1. A light grid comprising a housing defined by a longitudinally extending profile with parallel, spaced-apart side walls, at least one of spaced-apart radiation emitters and radiation transducers arranged over at least a portion of the length of the housing, an electronic component board positioned in the housing, extending over at least part of a length thereof, and mounting components of the light grid, the profile including a support plate and a spaced-apart intermediate web which are plane-parallel to each other and which connect the side walls, the intermediate web being located between the component board and the support plate, aligned openings respectively arranged in the intermediate web and in the support plate, optical elements mounted in the openings of the support plate, and positioning pins extending through openings in the support plate, fittingly engaging corresponding openings in the intermediate web, and fixing the position of the component board in the housing.

2. A light grid according to claim 1 wherein the openings in the intermediate web comprise apertures for the at least one of the radiation emitters and radiation transducers.

3. A light grid according to claim 1 wherein the profile of the housing includes a housing base which connects the side walls.

4. A light grid according to claim 1 including longitudinally extending guide grooves formed on interior surfaces of the side walls, and wherein the component plate movably engages the guide grooves.

5. A light grid according to claim 1 including a front pane closing a front side of the housing.

6. A light grid according to claim 5 including a resiliently compressed gasket between the front pane and at least one of the optical elements and the positioning pins in the openings of the support plate so that the at least one of the optical elements and the positioning pins are engaged and secured in place by the resiliently compressed gasket.

7. A light grid according to claim 1 wherein ends of the profile of the housing are open, and including an end cap closing an open end of the profile, the end cap including a projection extending from the open end of the profile into an interior of the housing, and a bore in the projection positioned to be engaged by a connecting member for fixing and securing the end cap to the housing.

* * * * *